US012143022B2

United States Patent
Zhao et al.

(10) Patent No.: US 12,143,022 B2
(45) Date of Patent: Nov. 12, 2024

(54) CONTROL CIRCUIT FOR CONTROLLING A POWER SWITCH IN A SWITCHING POWER SUPPLY CIRCUIT FOR IMPROVED EMI PERFORMANCE

(71) Applicant: Shenzhen Kiwi Instruments Corporation, Shenzhen (CN)

(72) Inventors: Wei Zhao, Shenzhen (CN); Xiufeng Yu, Shenzhen (CN); Bo Zhang, Shenzhen (CN)

(73) Assignee: Shenzhen Kiwi Instruments Corporation, Shenzhen (CN)

( * ) Notice: Subject to any disclaimer, the term of this patent is extended or adjusted under 35 U.S.C. 154(b) by 157 days.

(21) Appl. No.: 17/848,792

(22) Filed: Jun. 24, 2022

(65) Prior Publication Data
US 2022/0399818 A1    Dec. 15, 2022

(30) Foreign Application Priority Data

Jun. 24, 2021    (CN) .......................... 202110704935.8

(51) Int. Cl.
*H02M 3/335*    (2006.01)
*H02M 1/44*    (2007.01)

(52) U.S. Cl.
CPC ......... *H02M 3/33507* (2013.01); *H02M 1/44* (2013.01)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561;
(Continued)

(56) References Cited

U.S. PATENT DOCUMENTS 8,582,324 B2 * 11/2013 Lin ........................ H02M 1/14
                                                                         363/39
9,350,341 B2 * 5/2016 Lee ...................... H03K 17/165
(Continued)

FOREIGN PATENT DOCUMENTS

| CN | 103078489 | 5/2013 |
| CN | 113676051 | 11/2021 |

OTHER PUBLICATIONS

Chinese First Office Action issued in corresponding Chinese Application No. 2011107049358, issued on Jun. 24, 2022.

*Primary Examiner* — Jeffrey A Gblende
(74) *Attorney, Agent, or Firm* — NZ CARR LAW OFFICE

(57) ABSTRACT

A control circuit for controlling power switch in switching power supply circuit. The optimization circuit comprises an adaptive amplitude jitter generating circuit, a comparison circuit and a trigger circuit. The adaptive amplitude jitter generating circuit is used to generate a periodic amplitude jitter signal according to the feedback voltage signal indicative of the output of the switching power supply circuit. The comparison circuit is used to compare the sampled voltage signal with periodic amplitude jitter signal, and generate an output signal with periodic fluctuations. The trigger circuit is used for outputting the control signal for driving the power switch according to the output signal with periodic fluctuations and the clock signal.

17 Claims, 4 Drawing Sheets

(58) Field of Classification Search
CPC .. H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 5/2573; H02M 1/081; H02M 5/293; H02M 7/12; H02M 3/10; H02M 3/125; H02M 3/13; H02M 3/135; H02M 3/145; H02M 3/15; H02M 3/156; H02M 3/157; H02M 3/158; H02M 1/346; H02M 3/1588; H02M 2003/1566; H02M 3/1584; H02M 2003/1557; H02M 1/0032; H02M 1/4225; H02M 7/217; H02M 1/0025; H02M 1/0045; H02M 1/0009; H02M 1/088; Y02B 70/1491; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H05B 39/048; B23K 11/24; H04B 2215/069

See application file for complete search history.

(56) References Cited

U.S. PATENT DOCUMENTS

| | | | | |
|---|---|---|---|---|
| 9,966,831 | B2* | 5/2018 | Zhang | H02M 1/08 |
| 10,141,838 | B2* | 11/2018 | Zhang | H02M 3/33523 |
| 10,389,234 | B2* | 8/2019 | Lin | H02M 1/44 |
| 2022/0255438 | A1* | 8/2022 | Chen | H02M 3/33507 |

* cited by examiner

CONTROL CIRCUIT FOR CONTROLLING A POWER SWITCH IN A SWITCHING POWER SUPPLY CIRCUIT FOR IMPROVED EMI PERFORMANCE

CROSS-REFERENCE TO RELATED APPLICATIONS

This application claims priority to and the benefit of Chinese Patent Applications No. 202110704935.8, filed on Jun. 24, 2021, which is incorporated herein by reference in its entirety.

TECHNICAL FIELD

The present invention relates generally to electronic circuit, and more particularly but not exclusively relates to a control circuit for controlling a power switch in a switching power supply circuit and associated switching power supply circuit.

BACKGROUND

Generally, the PWM type switching power supply equipment works with a fixed switching frequency, so not only the circuit design and control are relatively simple, but also the EMI (Electro-Magnetic Interference) filter is relatively easy to design. But the disadvantage is that the noise interference is more serious at the switching frequency and harmonics. The function of frequency jittering is to make the switching frequency change periodically within a small range, which helps to reduce the EMI noise amplitude of the power supply.

In the flyback circuit, in order to improve the power efficiency and reduce the switching loss, it is hoped that the Metal-Oxide-Semiconductor Field-Effect Transistor (MOSFET) can be turned on at a position where the drain-source voltage is as low as possible, that is, the quasi-resonant valley turn-on technology.

As shown in FIG. 1 and FIG. 2, in discontinuous conduction mode (DCM mode), when the secondary side is demagnetized, the primary side inductance and the parasitic capacitance of MOSFET form an oscillation. When the drain-source voltage oscillates near the valley bottom, turn on the MOSFET of the primary side, which can effectively reduce the loss on the parasitic capacitance during turn-on. This working mode is usually called quasi-resonant working mode or valley conduction mode.

However, the valley conduction mode also has the problem that the frequency is not fixed, and it is impossible to directly superimpose a fixed frequency jitter, so it is difficult to realize the frequency jitter. At present, the commonly used frequency jittering method is to superimpose a fixed amplitude on the current sampling value. As shown in FIG. 3, to achieve frequency jitter to improve EMI, the system needs frequency to achieve jitter, and artificially superimposes a fixed amplitude jitter on the sampling value of the sampling resistor. The amplitude jitter of this period is superimposed on the feedback comparator, so that the output of the comparator produces a period of fluctuation, which in turn affects the RS flip-flop, and realizes the periodic change of the frequency.

However, the above method cannot adjust the amplitude of frequency jittering according to different loads, and affects the EMI performance of the output. When the output power is low, the sampling value on the sampling resistor is small, and the superimposed frequency jittering amplitude accounts for a large proportion, resulting in the output ripple is very large. Therefore, a large frequency jittering amplitude cannot be used, and the frequency range of the frequency jittering is affected, which further leads to the inability to achieve the ideal EMI optimization effect.

In view of the problems of the existing solutions, it is necessary to provide a new structure or method in order to solve at least some of the above problems.

SUMMARY

In one embodiment, a control circuit for controlling power switch in switching power supply circuit, integrated in a switching power supply circuit, the control circuit comprising an adaptive amplitude jitter generation circuit, a comparison circuit and a trigger circuit; the adaptive amplitude jitter generating circuit have an input and an output, the input of the adaptive amplitude jitter generating circuit is configured to receive the feedback voltage signal indicative of the output of the switching power supply circuit, the output of the adaptive amplitude jitter generating circuit is coupled to the first input of the comparison circuit, the second input of the comparison circuit is configured to receive the sample voltage of the switching power supply circuit, the output of the comparison circuit is coupled to the trigger circuit, the output of the trigger circuit is coupled to the power switch of the switching power supply circuit, wherein: the adaptive amplitude jitter generating circuit is used to generate a periodic amplitude jitter signal according to the feedback voltage signal indicative of the output of the switching power supply circuit; the comparison circuit is used to compare the sampled voltage signal with periodic amplitude jitter signal, and generate an output signal with periodic fluctuations; the trigger circuit is used for outputting the control signal for driving the power switch according to the output signal with periodic fluctuations and the clock signal.

In another embodiment, a control circuit for controlling power switch in switching power supply circuit, comprising: a comparison circuit, that compares the first signal and the second signal and provides a first control signal, the first control signal is used to switch the power switch from the first state to the second state, wherein the first signal is generated based on the first detection signal of the switching power supply circuit, and the second signal is generated based on the second detection signal of the switching power supply circuit; as well as a superimposing circuit, that superimposes a voltage signal to the first signal, the voltage signal produces periodic amplitude jitter signal, and the voltage signal is generated based on the first detection signal or the second detection signal.

And in yet another embodiment, a switching power supply circuit, comprises the control circuit of any one of claims and a power switch.

BRIEF DESCRIPTION OF THE DRAWINGS

Non-limiting and non-exhaustive embodiments are described with reference to the following drawings. The drawings are only for illustration purpose. Usually, the drawings only show part of the circuits/devices of the embodiments.

DETAILED DESCRIPTION

Reference will now be made in detail to the preferred embodiments of the application, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Throughout the specification and claims, the term "couple" or "connect" as used herein, is defined as either directly, or indirectly connecting one to another via intermediary such as via electrical conducting materials which may have resistance, parasitic inductance or capacitance, or via other material(s) or component(s) as would be known to person skilled in the art without departure from the spirit and scope of the invention as defined by the appended claims.

Figure 1:
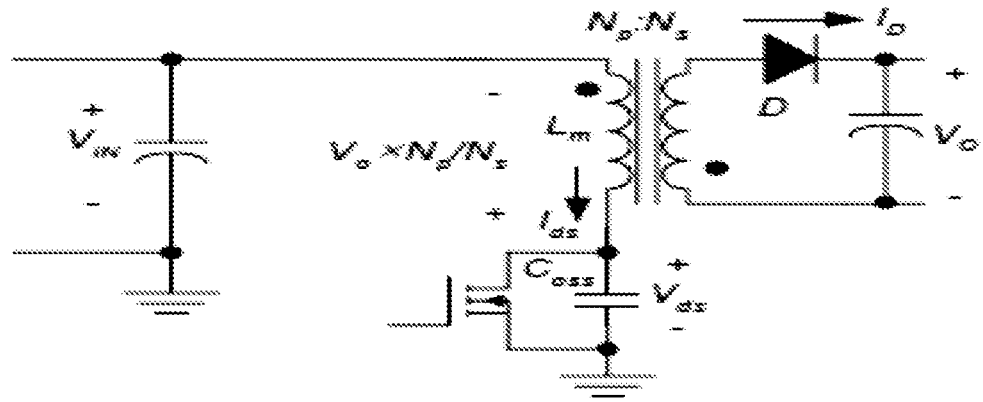
FIG. 1 illustrates a circuit diagram of a quasi-resonant working mode of the prior art.
Figure 2:
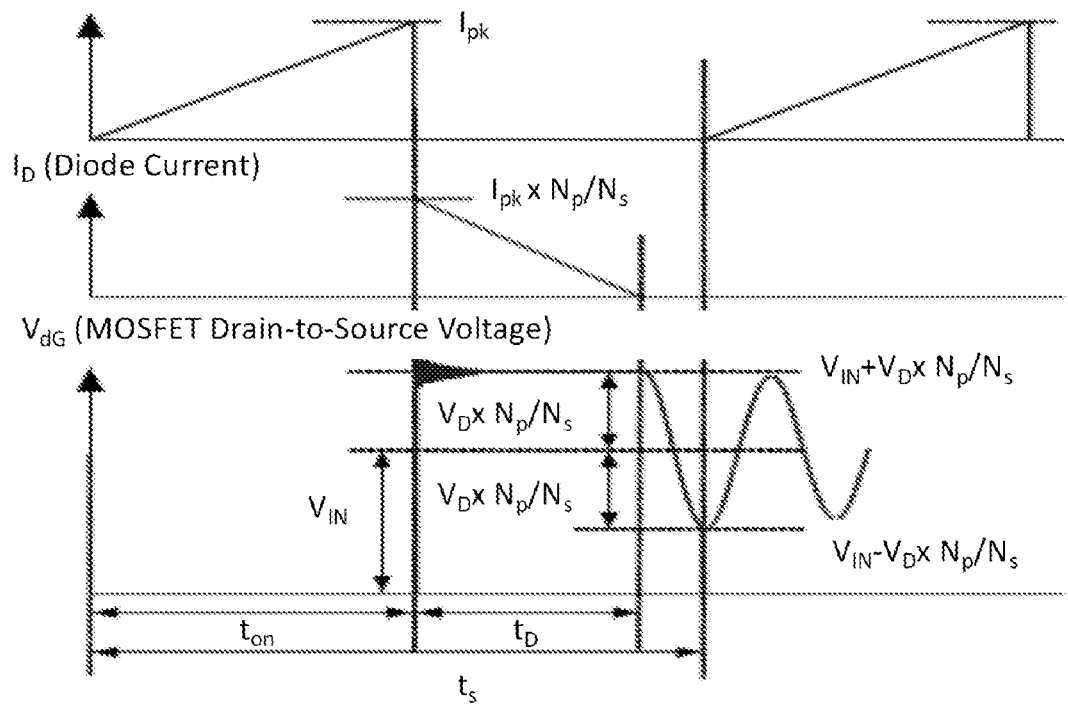
FIG. 2 illustrates a waveform diagram of the quasi-resonant working mode of the prior art.
Figure 3:
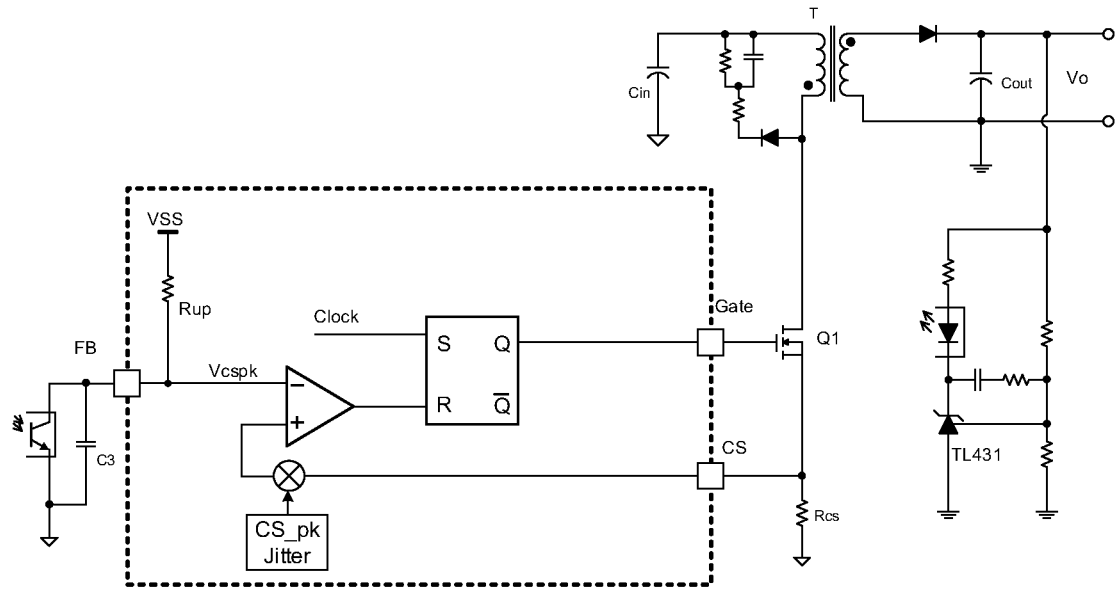
FIG. 3 illustrates a circuit diagram of the prior art for improving EMI by frequency dithering.
Figure 4:
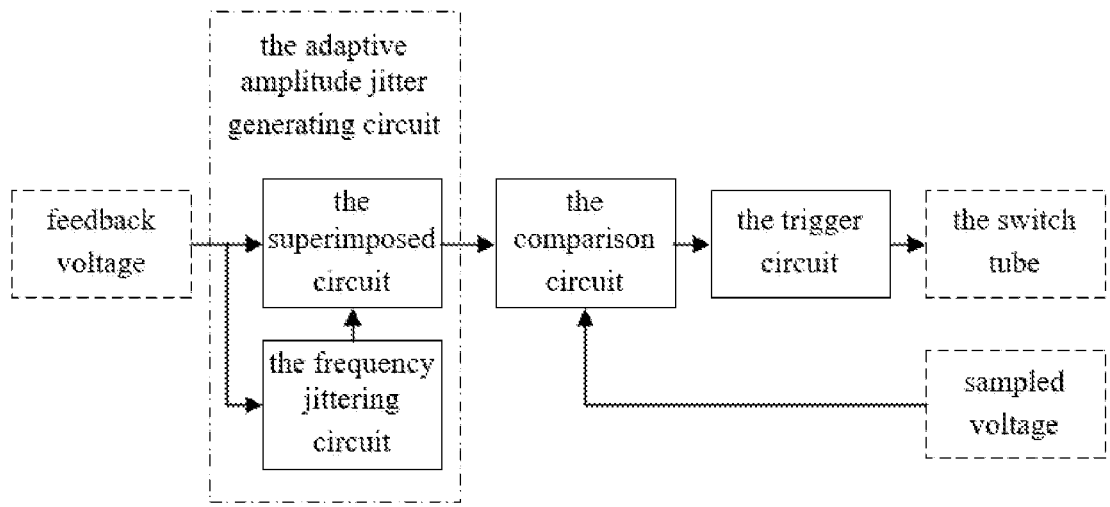
FIG. 4 illustrates a structural block diagram of a control circuit for controlling a power switch in switching power supply circuit according to an embodiment of the present invention.

FIG. 4 illustrates a structural block diagram of a control circuit according to an embodiment of the present application. As shown in FIG. 4, the control circuit comprises an adaptive amplitude jitter generating circuit, a comparison circuit and a trigger circuit. The adaptive amplitude jitter generating circuit have an input and an output, the input of the adaptive amplitude jitter generating circuit is configured to receive the feedback voltage of output of the switching power supply circuit, the output of the adaptive amplitude jitter generating circuit is coupled to the first input of the comparison circuit, and the second input of the comparison circuit is configured to receive the sampling voltage of the switching power supply circuit, the output of the comparison circuit is coupled to the trigger circuit, and the output terminal of the trigger circuit is coupled to the power switch of the switching power supply circuit.

The adaptive amplitude jitter generating circuit is used to generate periodic amplitude jitter signal according to the feedback voltage signal indicative of the output of the switching power supply circuit.

Figure 5:
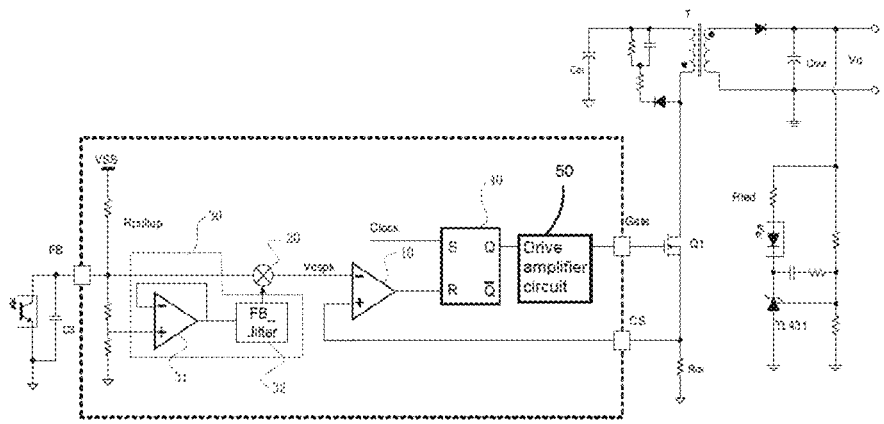
FIG. 5 illustrates a circuit structure diagram of a switching power supply circuit according to an embodiment of the present application.

The comparison circuit is used for comparing the sampled voltage signal with the periodic amplitude jitter signal to generate an output signal called Vcspk with periodic fluctuation. As shown in FIG. 5, in one embodiment, the comparison circuit comprises a feedback comparator, the non-inverting input of the feedback comparator is configured to receive the voltage Vcs of the sampling resistor of the switching power supply circuit, the inverting input of the feedback comparator is coupled to the output of the superposition circuit, and the output of the feedback comparator is coupled to the trigger circuit.

The trigger circuit is used for outputting the control signal for driving the power switch according to the output signal with periodic fluctuations and the clock signal. In one embodiment, the trigger circuit comprises an RS flip-flop, the Setting input of the RS flip-flop is configured to receive the synchronization control signal Clock, the Resetting input of the RS flip-flop is coupled to the output of the comparison circuit, and the Output of the RS flip-flop is coupled to the power switch of the switching power supply circuit.

As shown in FIG. 4, in another embodiment, the control circuit includes a frequency jittering circuit, a superimposing circuit, a comparison circuit and a trigger circuit.

The input of the frequency jittering circuit and the first input of the superimposing circuit are both coupled to the feedback voltage signal indicative of the output of the switching power supply circuit, the output of the frequency jittering circuit is coupled with the second input end of the superposition circuit, and the output end of the superposition circuit is compared with The first input end of the circuit is coupled, the second input end of the comparison circuit is connected to the sampling voltage of the switching power supply circuit, the output end of the comparison circuit is coupled with the trigger circuit, and the output end of the trigger circuit is coupled with the power switch of the switching power supply circuit.

The frequency jittering circuit is used to generate a jittering signal having periodic jitter frequency according to the feedback voltage signal indicative of the output of the switching power supply circuit. In one embodiment, the frequency jittering circuit comprises a voltage follower and a frequency jittering generator, the non-inverting input of the voltage follower is configured to receive the feedback voltage signal indicative of the output of the switching power supply circuit, and the inverting input of the voltage follower is coupled to its own output. The output of the voltage follower is also coupled to the input of the frequency jitter generator, and the output of the frequency jitter generator is coupled to the second input of the superposition circuit. In another embodiment, the frequency jittering circuit comprises a voltage follower, a frequency jittering generator and a voltage divider circuit, the non-inverting input of the voltage follower is configured to receive the feedback voltage signal indicative of the output of the switching power supply circuit through the voltage divider circuit, and the inverting input of the voltage follower is coupled to its own output. The output of the voltage follower is also coupled to the input of the frequency jitter generator, and the output of the frequency jitter generator is coupled to the second input of the superposition circuit.

The superimposing circuit is used to superimpose the feedback voltage signal indicative of the output of the switching power supply circuit and the jittering signal to generate the periodic amplitude jitter signal.

The comparison circuit is used to compare the sampled voltage signal with periodic amplitude jitter signal, and generate an output signal with periodic fluctuations. In one embodiment, the comparison circuit comprises a feedback comparator, the non-inverting input of the feedback comparator is configured to receive the voltage of the sampling resistor of the switching power supply circuit. The inverting input of the feedback comparator is coupled to the output of the superimposing circuit, and is configured to receive the superposition signal Vcspk. The output of the feedback comparator is coupled to the trigger circuit.

The trigger circuit is used for outputting the control signal for driving the power switch according to the output signal with periodic fluctuations and the clock signal. In one embodiment, the trigger circuit comprises an RS flip-flop, the Setting input of the RS flip-flop is configured to receive the synchronization control signal Clock, the Resetting input of the RS flip-flop is coupled to the output of the comparison circuit, and the Output of the RS flip-flop is coupled to the power switch of the switching power supply circuit.

In the fixed switching power supply circuit system, the feedback voltage (FB voltage) of the system is a continuous linear value, and the FB voltage reflects the load characteristics of the system. By sampling the FB voltage of the system, a jittering signal FB_jitter is superimposed on the FB voltage, the output of the periodic amplitude jitter signal is added into the output of the feedback comparator, so that the output of the feedback comparator produces periodic fluctuations, which affects the RS flip-flop to realize the periodic change of frequency. At the same time, according to the size of the FB voltage, the system automatically adjusts the amplitude of the frequency jitter. When the system works under light load, the FB voltage is low, and the sampling voltage on CS is also low. Using a low frequency jitter amplitude can achieve the ideal EMI optimization effect without introducing large ripples. When the system works under heavy load, the FB voltage is large, and the sampling value on CS is also large. According to the frequency jitter adjusted by the FB voltage, a relatively large frequency jitter amplitude can be achieved, so as to achieve the ideal EMI optimization effect.

The implementation process of the control circuit of the present invention is as follows:

Taking the flyback converter as an example, in the DCM mode (discontinuous mode), as shown in FIG. 5, when Q1 is turned on, the starting end of the windings of the transformer T is positive, and the rectifier diode D1 is reverse-biased and turned off, so when Q1 is turned on, there is no current flows in the secondary winding. In this energy storage stage, only the primary winding is active; when Q1 is turned off, the current of the primary winding will drop to zero. As the magnetic field density changes in the negative direction, the voltages in all windings are reversed, the rectifier diode D1 on the secondary side will be turned on, and a current will be generated on the secondary side. At this time, the primary side voltage of the transformer T is clamped by the output voltage. The energy in the inductor continues to be transferred to the secondary side until zero. At this time, the magnetizing inductance of the primary side of the transformer and the capacitor Cd in the main power loop form an oscillation circuit. When the voltage across Q1 oscillates to the bottom, Q1 is turned on and enters the next cycle. The output voltage passes through a feedback network composed of a voltage divider resistor, a voltage regulator tube TL431, an optocoupler poto1, and a loop capacitor resistor, and to transmit the output load to the primary side. The heavier the load, the lower the input signal of poto1, and the higher the FB signal, so as to realize the transmission of the load signal.

According to another aspect of the present invention, a switching power supply circuit comprises a primary side coil T, a secondary side coil with mutual inductance with the primary side coil, a power switch Q1, a sampling resistor Rcs, an optocoupler and any one of the above adaptive quasi-resonant EMI optimized circuit. In one embodiment, the power switch Q1 and the sampling resistor Rcs are serially connected to the primary coil T in sequence, the other end of the sampling resistor Rcs is grounded, and the Gate terminal of the power switch Q1 is coupled to the output of the control signal of the control circuit. The connection point of the power switch Q1 and the sampling resistor Rcs is connected to the second input of the comparison circuit of the control circuit, the transmitting end of the optocoupler is coupled to the output of the switching power supply circuit, and the receiving end of the optocoupler is coupled to the input of the adaptive amplitude jitter generating circuit of the control circuit.

According to another aspect of the present invention, a control method for controlling power switch in switching power supply circuit, used in a switching power supply circuit, comprises:

S1: Obtain the feedback voltage signal of the output of the switching power supply circuit, and generate a periodic amplitude jitter signal according to the feedback voltage signal above.

In one embodiment, the amplitude of the periodic amplitude jitter signal is adjusted by the amplitude of the feedback voltage signal of the output terminal.

In another embodiment, a method of generating a periodic amplitude jitter signaled signal includes:

S1-1: Generate jittering signal according to the feedback voltage signal at the output terminal.

S1-2: The feedback voltage signal of the output is superimposed with the jittering signal to generate a periodic amplitude jitter signal.

S2: Obtain the sampled voltage signal of the switching power supply circuit, compare the sampled voltage signal with the periodic amplitude jitter signal, and generate an output signal with periodic fluctuations.

S3: Generate a control signal according to the output signal with periodic fluctuation and the clock signal, and drive the power switch of the switching power supply circuit.

Figure 6:
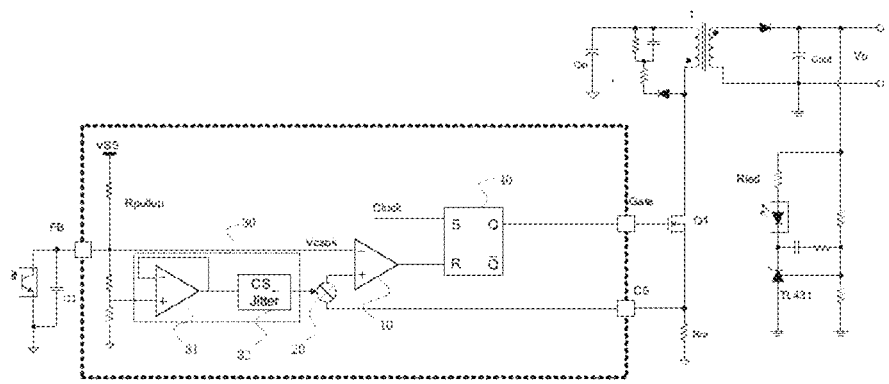
FIG. 6 illustrates a circuit structure diagram of a control circuit for controlling a power switch in switching power supply circuit according to another embodiment of the present invention.
Figure 7:
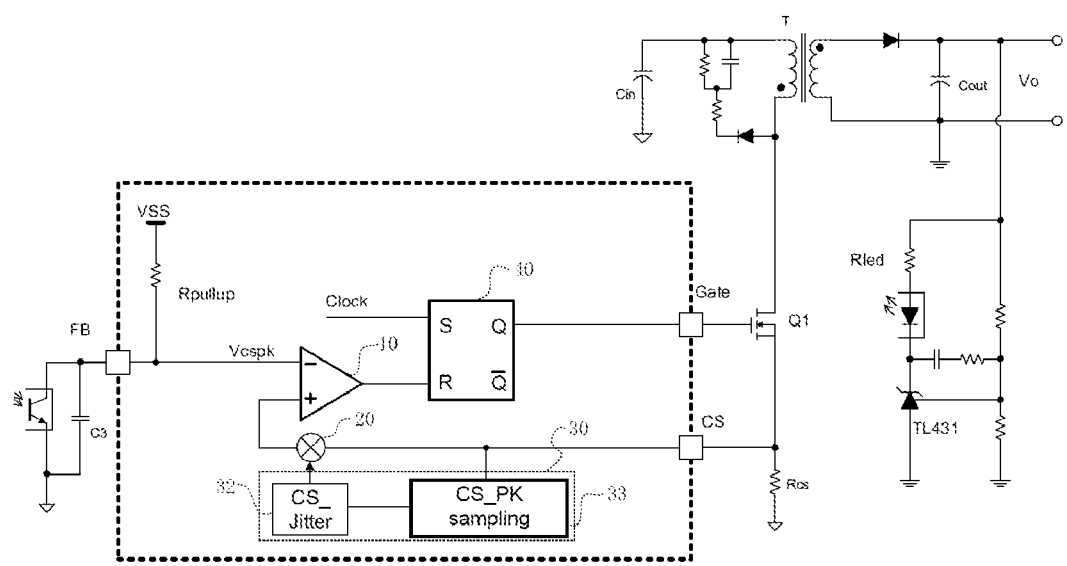
FIG. 7 illustrates a circuit structure diagram of a control circuit for controlling a power switch in switching power supply circuit according to another embodiment of the present invention.

An embodiment of the present invention discloses a control circuit for controlling a power switch in a switching power supply circuit. As shown in FIGS. 5-7, the control circuit includes a comparison circuit and a superposition circuit. in:

The comparison circuit is used to compare the first signal and the second signal and provide the first control signal, and the first control signal is used to switch the switch Q1 from the first state to the second state, the first signal is generated based on the first detection signal of the switching power supply circuit, and the second signal is generated based on the second detection signal of the switching power supply circuit. The superimposing circuit is used for superimposing a voltage signal to the first signal, the voltage signal generates periodic amplitude jitter signal, wherein the voltage signal is generated based on the first detection signal or the second detection signal.

In one embodiment, the first detection signal represents the output voltage of the switching power supply circuit, and the second detection signal represents the current flowing through the power switch. In another embodiment, the first detection signal represents the current flowing through the power switch, and the second detection signal represents the output voltage of the switching power supply circuit.

In one embodiment, the amplitude of the voltage signal is proportional to the first detection signal. In another embodiment, the reference value of the voltage signal is proportional to the first detection signal. In yet another embodiment, the voltage signal changes in real time or intermittently according to the first detection signal. In yet another embodiment, the period of the voltage signal varies with the switching period of the switch, and the period of the voltage signal is between one-thirtieth and one-half of the switching period.

In a specific embodiment, as shown in FIG. 5, the comparison circuit includes a comparator 10, and the inverting input terminal of the comparator 10 is coupled to the output terminal of the superposition circuit 20 to obtain a first signal Vospk, the first signal Vcspk It is obtained based on the superposition of the output voltage signal of the switching power supply circuit and a voltage signal, wherein the voltage signal is generated based on the output voltage signal of the switching power supply circuit; the positive input terminal of the comparator 10 is coupled to the sampling resistor Rcs of the switching power supply circuit and obtains The second signal is obtained based on the current flowing through the power switch Q1 of the switching power supply circuit; the comparator 10 compares the first signal Vospk with the second signal and outputs the first control signal. The switch Q1 is switched from the first state to the second state based on the first control signal. Specifically, the first state is an on state, and the second state is an off state.

In another specific embodiment, as shown in FIG. 6, the comparison circuit includes a comparator 10, and the inverting input terminal of the comparator 10 is coupled to the feedback signal terminal FB of the switching power supply circuit and obtains the first signal Vcspk, then the first signal Vcspk is obtained based on the output voltage feedback signal of the switching power supply circuit; the positive input terminal of the comparator 10 is coupled to the output terminal of the superposition circuit 20 and obtains the second signal, and the input terminal of the superposition circuit 20 is coupled to the switching power supply circuit. Sampling the resistor Rcs and obtain the sampled voltage signal, the sampling resistor Rcs and the power switch Q1 are connected in series on the primary side of the switching power supply circuit, then the second signal is superimposed based on the current flowing through the power switch Q1 of the switching power supply circuit and a voltage signal Then, the voltage signal is generated based on the output voltage of the switching power supply circuit; the comparator 10 compares the first signal Vcspk with the second signal and outputs the first control signal. The switch Q1 is switched from the first state to the second state based on the first control signal. Specifically, the first state is an on state, and the second state is an off state.

In yet another specific embodiment, as shown in FIG. 7, the comparison circuit includes a comparator 10, and the inverting input terminal of the comparator 10 is coupled to the feedback signal terminal FB of the switching power supply circuit and obtains the first signal Vcspk, then the first signal Vospk is obtained based on the output voltage feedback signal of the switching power supply circuit; the positive input terminal of the comparator 10 is coupled to the output terminal of the superposition circuit 20 and obtains the second signal, and the input terminal of the superposition circuit 20 is coupled to the switching power supply circuit. Sampling the resistor Rcs and obtain the sampled voltage signal, the sampling resistor Rcs and the power switch Q1 are connected in series on the primary side of the switching power supply circuit, then the second signal is based on the current flowing through the power switch Q1 of the switching power supply circuit and a voltage signal superimposed Then, the voltage signal is generated based on the current flowing through the power switch Q1 of the switching power supply circuit; the comparator 10 compares the first signal Vcspk with the second signal and outputs the first control signal. The switch Q1 is switched from the first state to the second state based on the first control signal. Specifically, the first state is an on state, and the second state is an off state.

In an embodiment of the present invention, the control circuit further includes a frequency jittering circuit. The input end of the frequency jittering circuit is coupled to the first detection signal, and the output end is coupled to the input end of the superposition circuit for providing a voltage signal.

In a specific embodiment, as shown in FIG. 5, the frequency jittering circuit 30 includes a voltage following circuit 31 and a frequency jittering signal generating circuit 32, wherein the non-inverting input terminal of the voltage following circuit 31 is connected to the first detection signal, and the first detection signal is generated based on the output voltage of the switching power supply circuit, and the output end of the voltage follower circuit 31 is coupled to its inverting input end; the input end of the frequency jittering signal generating circuit 32 is coupled to the output end of the voltage follower circuit 31, and the frequency jittering The output terminal of the signal generating circuit 32 is coupled to the superposition circuit 20 for providing a voltage signal to the superposition circuit 20. Specifically, the first detection signal obtained based on the output voltage of the switching power supply circuit firstly obtains the output voltage signal of the switching power supply circuit through the optocoupler Rled, and then obtains the first detection signal after voltage division processing. The superposition circuit 20 superimposes the voltage signal provided by the frequency jittering signal generating circuit 32 and the output voltage feedback signal of the switching power supply circuit to obtain the first signal Vcspk.

In another specific embodiment, as shown in FIG. 6, the frequency jittering circuit 30 includes a voltage follower circuit 31 and a frequency jitter signal generating circuit 32, wherein the non-inverting input terminal of the voltage follower circuit 31 is connected to the first detection signal, so The first detection signal is generated based on the output voltage feedback signal of the switching power supply circuit, the output terminal of the voltage follower circuit 31 is coupled to its inverting input terminal; the input terminal of the frequency jittering signal generating circuit 32 is coupled to the output terminal of the voltage follower circuit 31, the output terminal of the frequency jittering signal generating circuit 32 is coupled to the superimposing circuit 20 and provides a periodic jittering voltage signal to the superimposing circuit 20. Specifically, the first detection signal obtained based on the output voltage feedback signal of the switching power supply circuit firstly obtains the output voltage signal of the switching power supply circuit through the optocoupler Rled, and then obtains the first detection signal after voltage division processing. Specifically, in this embodiment, a periodically jittered voltage signal is superimposed in the sampling link, and the periodically jittered voltage signal is generated based on the output voltage feedback signal of the switching power supply circuit.

In yet another specific embodiment, as shown in FIG. 7, the frequency jittering circuit 30 includes a sampling circuit 33 and a frequency jittering signal generating circuit 32, wherein the input end of the sampling circuit 33 is coupled to the sampling resistor Rcs of the switching power supply circuit and connected to Sampling the voltage signal; the input end of the frequency jittering signal generating circuit 32 is coupled to the output end of the frequency jittering circuit 30, and the output end of the frequency jittering signal generating circuit 32 is coupled to the superposition circuit 20 and provides a voltage signal to the superposition circuit 20. Specifically, in this embodiment, a voltage signal with periodic jitter is superimposed in the sampling link, and the maximum value of the sampled voltage signal is used as a reference.

In an embodiment of the present invention, the control circuit further includes a valley conduction control circuit. The valley conduction control circuit generates a second control signal based on the demagnetization signal of the switching power supply circuit, and the second control signal is used to switch the switching transistor Q1 from the second state to the first state. In a specific embodiment, the first state is an on state, and the second state is an off state.

In an embodiment of the present invention, the control circuit further includes a trigger circuit and a drive amplifier circuit. An input end of the trigger circuit is coupled to the output end of the comparison circuit, the output end of the trigger circuit is coupled to the input end of the driving amplifying circuit, and the output end of the driving amplifying circuit is coupled to the control end of the power switch.

In a specific embodiment, as shown in FIG. 5, the first input end R of the trigger circuit 40 is coupled to the comparison circuit 20 and receives the first control signal, and the second input end of the trigger circuit 40 receives the second control signal Clock; The input terminal of the driving amplifier circuit (not shown in the figure) is coupled to the output terminal of the trigger circuit 40, and the output terminal of the driving amplifier circuit is coupled to the control terminal of the switch transistor Q1. Specifically, the second control signal Clock is generated based on the demagnetization signal of the switching power supply circuit.

In an embodiment of the present invention, the switching power supply circuit includes a flyback voltage conversion circuit, wherein the switch Q1 is a primary switch of the flyback voltage conversion circuit.

Another embodiment of the present invention also discloses a control circuit for controlling a power switch in a switching power supply circuit, the control circuit includes a comparison circuit, a frequency jittering circuit and a superposition circuit, wherein the comparison circuit is used to compare and characterize the flow through the power switch The current detection signal and reference signal of the current, wherein the reference signal is generated based on the feedback signal reflecting the output load of the switching power supply circuit, the comparison circuit is used to control the turn-off of the power switch; the frequency jittering circuit is used to generate jitter based on the feedback signal or the current detection signal frequency signal; the superposition circuit is used to superimpose the frequency jittering signal to the current detection signal or the reference signal.

Yet another embodiment of the present invention also discloses a switching power supply circuit, which includes any one of the above-mentioned control circuits and a power switch.

In one embodiment, the switching power supply circuit further includes a transformer T, a secondary side rectifier, an optocoupler compensation circuit and a sampling resistor Rcs.

In a specific embodiment, as shown in FIGS. 5-7, the transformer T includes a primary winding and a secondary winding, wherein the first end of the primary winding is coupled to the input end of the switching power supply circuit, and the second end of the primary winding is coupled to the input end of the switching power supply circuit. The terminal is coupled to the first terminal of the switch Q1. The secondary side rectifier is coupled to the secondary side winding, and is used for providing an output voltage at the output end of the switching power supply circuit. The optocoupler compensation circuit includes an optocoupler Rled, the transmitting end of the optocoupler Rled is coupled to the output end of the switching power supply circuit, and the receiving end of the optocoupler Rled is coupled to the first detection input end of the control circuit. The first end of the sampling resistor Rcs is coupled to the second end of the power switch Q1 and the second detection input end of the control circuit, the second end of the sampling resistor Rcs is coupled to the primary ground, and the output end of the control circuit is coupled to the power switch Q1 Control terminal.

The advantages and effects in the description may not be shown in specific examples considering variable conditions and the results may further be affected by other factors not mentioned.

It will be appreciated by persons skilled in the art that the present invention is not limited to what has been particularly shown and described herein above. Rather the scope of the present invention is defined by the claims and includes both combinations and sub-combinations of the various features described herein above as well as variations and modifications thereof which would occur to persons skilled in the art upon reading the foregoing description and which are not in the prior art.

The invention claimed is:

1. A control circuit for controlling a power switch in a switching power supply circuit, the control circuit comprising an adaptive amplitude jitter generation circuit, a comparison circuit and a trigger circuit, wherein an input of the adaptive amplitude jitter generating circuit is configured to receive a feedback voltage signal indicative of an output of the switching power supply circuit, an output of the adaptive amplitude jitter generating circuit is coupled to a first input of the comparison circuit, a second input of the comparison circuit is configured to receive a sample voltage of the switching power supply circuit, an output of the comparison circuit is coupled to an input of the trigger circuit, and an output of the trigger circuit is coupled to a control end of the power switch, and wherein:

the adaptive amplitude jitter generating circuit is configured to generate a periodic amplitude jitter signal according to a feedback voltage;

the comparison circuit is configured to compare the sampled voltage signal with the periodic amplitude jitter signal, and generate an output signal with periodic fluctuations;

the trigger circuit provides a control signal for driving the power switch according to the output signal with periodic fluctuations and a clock signal; and wherein the adaptive amplitude jitter generating circuit comprises a frequency jittering circuit and a superimposing circuit, and an input of the frequency jittering circuit and a first input of the superimposing circuit receives the feedback voltage, an output of the frequency jittering circuit is coupled to a second input of the superimposing circuit, and an output of the superimposing circuit is coupled to a first input of the comparison circuit, wherein:
the frequency jittering circuit is used to generate a jittering signal having periodic jitter frequency according to the feedback voltage;
the superimposing circuit is used to superimpose the feedback voltage and the jittering signal to generate the periodic amplitude jitter signal.

2. The control circuit of claim 1, wherein the frequency jittering circuit comprises a voltage follower and a frequency jittering generator; the non-inverting input of the voltage follower is configured to receive the feedback voltage signal, the inverting input of the voltage follower is coupled to its own output, and the output of the voltage follower is coupled to the input of the frequency jittering generator, the output of the frequency jittering generator is coupled to the second input of the superimposing circuit.

3. The control circuit of claim 2, wherein the frequency jittering circuit further comprises a voltage divider circuit; and a non-inverting input of the voltage follower is configured to receive the feedback voltage signal through the voltage divider circuit.

4. The control circuit of claim 1, wherein the comparison circuit comprises a feedback comparator,
wherein the feedback comparator includes a non-inverting input, an inverting input, and an output,
Wherein the non-inverting input of the feedback comparator is configured to receive a voltage of a sampling resistor of the switching power supply circuit, the inverting input of the feedback comparator is coupled to the output of the superimposing circuit, and the output of the feedback comparator is coupled to the trigger circuit.

5. The control circuit of claim 1, wherein the trigger circuit comprises an RS flip-flop, wherein the RS flip-flop includes a setting input, an resetting input, and an output, wherein the setting input of the RS flip-flop is configured to receive a synchronization control signal, the resetting input of the RS flip-flop is coupled to the output of the comparison circuit, and the output of the RS flip-flop is coupled to the power switch.

6. A control circuit for controlling a power switch in switching power supply circuit, comprising:
a comparison circuit configured to compare a first signal and a second signal and provide a first control signal, the first control signal is configured to switch the power switch from a first state to a second state, wherein the first signal is generated based on a first detection signal of the switching power supply circuit, and the second signal is generated based on a second detection signal of the switching power supply circuit; and
a superimposing circuit configured to superimpose a voltage signal to the first signal, the voltage signal having periodic amplitude jitter, and the voltage signal is generated based on the first detection signal or the second detection signal; and
a frequency jittering circuit, and the frequency jittering circuit includes:
a voltage follower circuit and wherein an input terminal of the voltage follower circuit receives the first detection signal; and
a frequency jittering signal generating circuit wherein an input end of the frequency jittering signal generating circuit is coupled to the output end of the voltage follower circuit, an output end of the frequency jittering signal generating circuit is coupled to the superimposing circuit for providing a voltage signal.

7. The control circuit of claim 6, wherein the first state is an on state, and the second state is an off state.

8. The control circuit of claim 7, further comprises a valley conduction control circuit, which generates a second control signal based on a demagnetization state of the switching power supply circuit, and the second control signal is used to switch the power switch from the second state to the first state.

9. The control circuit of claim 6, wherein the first detection signal represents an output voltage of the switching power supply circuit, and the second detection signal represents a current flowing through the power switch.

10. The control circuit of claim 6, wherein the first detection signal represents a current flowing through the power switch, and the second detection signal represents an output voltage of the switching power supply circuit.

11. The control circuit of claim 6 further comprising:
a trigger circuit wherein a first input terminal of the trigger circuit receives a first control signal, and a second input terminal of the trigger circuit receives a second control signal; and
a drive amplifier circuit, wherein the input end of the drive amplifier circuit is coupled to the output end of the trigger circuit, and an output end of the drive amplifier circuit is coupled to a control end of the power switch.

12. The control circuit of claim 6, wherein the switching power supply circuit comprises a flyback voltage conversion circuit, wherein the power switch is a primary side switch of the flyback voltage conversion circuit.

13. The control circuit of claim 6, wherein an amplitude of the voltage signal is proportional to the first detection signal.

14. The control circuit of claim 6, wherein the voltage signal changes in real time according to the first detection signal.

15. The control circuit of claim 6, wherein a period of the voltage signal changes with period of the power switch, the period of the voltage signal is between one-thirtieth and one-half of a switching period.

16. A switching power supply circuit, comprising the control circuit of claim 6 and the power switch.

17. The switching power supply circuit of claim 16, further comprising:
a transformer includes a primary winding and a secondary winding, wherein a first end of the primary winding is coupled to an input end of the switching power supply circuit, and a second end of the primary winding is coupled to a first end of the power switch;
a secondary side rectifier tube, coupled to the secondary side winding, is used to provide an output voltage at an output end of the switching power supply circuit;
an optocoupler compensation circuit, including an optocoupler, a transmitting end of the optocoupler is coupled to the output end of the switching power supply circuit, and a receiving end of the optocoupler is coupled to a first detection input end of the control circuit; and
a first end of the sampling resistor is coupled to a second end of the power switch and a second detection input end of the control circuit, a second end of the sampling resistor is coupled to a primary ground, and an output end of the control circuit is coupled to a control end of the power switch.

* * * * *